United States Patent [19]

Abrams et al.

[11] Patent Number: 4,888,372

[45] Date of Patent: Dec. 19, 1989

[54] HIGH SOLIDS SOLVENT-BASED POLYESTER COATING COMPOSITION

[75] Inventors: Sonja M. J. Abrams, Leuven; Robert V. A. Vervoort, Deurne, both of Belgium

[73] Assignee: E. I. Du Pont De Nemours and Company, Wilmington, Del.

[21] Appl. No.: 210,337

[22] Filed: Jun. 23, 1988

[51] Int. Cl.$^4$ .................... C08L 1/14; C08L 67/08
[52] U.S. Cl. ...................... 524/197; 524/315; 524/216; 524/502; 524/507; 524/512; 524/513
[58] Field of Search ............ 524/197, 315, 216, 502, 524/507, 512, 513

[56] References Cited

U.S. PATENT DOCUMENTS

| | | | |
|---|---|---|---|
| 3,893,956 | 7/1975 | Brandt | 524/216 |
| 4,131,581 | 12/1978 | Coker | 524/216 |
| 4,461,858 | 7/1984 | Adelman | 524/502 |
| 4,551,492 | 11/1985 | Aerts | 524/40 |

FOREIGN PATENT DOCUMENTS 2313444  9/1974  Fed. Rep. of Germany.
 125831  9/1979  Japan.

Primary Examiner—John Kight
Assistant Examiner—Dennis R. Daley
Attorney, Agent, or Firm—Richard H. Burgess

[57] ABSTRACT

A 20–25% weight spray solids coating composition can be achieved with a binder consisting of about 30% polyester, 25% melamine crosslinker, 7% of cellulose acetate butyrate and 25% acrylic resin containing a thixotropic agent.

6 Claims, No Drawings

HIGH SOLIDS SOLVENT-BASED POLYESTER COATING COMPOSITION

BACKGROUND OF THE INVENTION

Solvent-based coating composition containing polyester, melamine crosslinkers, plasticizers, wax dispersions and cellulose acetate butyrate resins are available at 14% and 18% solids level. The latter is shown in U.S. Pat. No. 4,551,492—Aerts et al (1985). It is desirable to be able to increase the application solids to the 20-25% level to decrease the expense of the solvents, the heat needed to evaporate them and the air pollution effects of the evaporated solvents, and to have a broader application latitude.

SUMMARY OF THE INVENTION

The present invention provides a coating composition consisting essentially, in percent by weight based on the binder, of a binder consisting of about 25-35% polyester resin, 20-30% of a melamine crosslinker resin, 2-6% polyurea plasticizer, 3-6% polyethylene vinyl acetate copolymer wax dispersion, 4-10% of a cellulose acetate butyrate resin, 15-30% of a styrenated acrylic resin containing a thixotropic agent, with 0.5-1.5% thixotropic agent based on binder solids and flow additives, plus optionally pigments and extenders. Pigments are used in the pigment-to-binder weight ratios in the range of 10-40 units of pigment to 100 units of binder.

DETAILED DESCRIPTION OF THE INVENTION

To increase the solids content of polyester containing coatings which are the subject of the invention, the amount of cellulose acetate butyrate resin and the amount of polyester resin have been decreased and a fairly high amount of acrylic resin containing thixotropic agent has been included. In the following example and comparative test, parts, percentages and proportions are by weight except where indicated otherwise. The components indicated provide the resin solids. They are formulated with suitable amounts of fast and slow, polar and non-polar solvents to achieve the indicated solids content. The comparative test is from the above-identified Aerts patent.

Comparative Test

| 18% by Weight Spray Solids | Parts |
| --- | --- |
| Polyester resin at 50% solids in 50—50 blend butylacetate-xylene Dynapol H700 (Dynamite Nobel) | 39.6 |
| Melamine crosslinker resin partially butylated at 55% solids in isobutyl alcohol-Maprenal MF650 (Hoechst) | 26.4 |
| Polyurea plasticizer-carbamic acid ester from butylurethane and formaldehyde Resamine HF450 (Hoechst) | 10.0 |
| Polyethylene vinyl acetate copolymer, as a 6% wax dispersion in xylene-butylacetate in a ratio of 40/54 | 8.0 |
| 2 Secs cellulose acetate butyrate Cellit BP700 (Bayer) | 8.0 |
| 20 Secs cellulose acetate butyrate Cellit BP900 (Bayer) | 8.0 |

This formulation produces satisfactory patent at 18% solids, but not at a higher and more desirable solids level. These pigmented systems are applied to automobiles using conventional spraying and curing techniques.

EXAMPLE 1

| | Parts |
| --- | --- |
| Oil-free polyester resin at 65% solids in xylene with OH number about 100 and $\overline{Mw}$ about 10,000 | 32.5 |
| Melamine crosslinker resin partially butylated at 55% solids in isobutyl alcohol-Maprenal MF650 (Hoechst) | 25.0 |
| Polyurea plasticizer-carbamic acid ester from butylurethane and formaldehyde Resamine HF450 (Hoechst) | 4.0 |
| Polyethylene vinyl acetate copolymer, as a 6% wax dispersion in xylene-butyl acetate 40/54 | 5.5 |
| 2 Secs cellulose acetate butyrate Cellit BP700 (Bayer) | 8.0 |
| Urea modified acrylic resin at 70% solids in Solvesso 100(Exxon)-xylene 89/11 ratio based on a partially styrenated acrylic with OH number about 145 and $\overline{Mw}$ about 3000 polymerized in the presence of isocyanate and amine constituents to produce urea thixotropic agent in accordance with U.S. Pat. 4,311,622 - Buter (1982) | 25.0 |

With ordinary pigmentation this formulation at 20-25% spray solids produces desirable automotive paint by spraying and curing.

We claim:

1. A coating composition with a binder consisting essentially, in percent by weight, of a binder consisting essentially of about
   25-35% of a polyester resin,
   20-30% of a melamine crosslinker resin,
   2-6% of a polyurea plasticizer
   3-6% of a ethylene vinyl acetate copolymer wax dispersion,
   4-10% of a cellulose acetate butyrate resin,
   15-30% of a styrenated acrylic resin with an isocyanate-amine thixotropic agent, so that the amount of thixotropic agent is 0.5-1.5% based on binder solids,
   plus flow additives,
   said binder being dispersed in a liquid media comprising solvents at a binder solids content of about 20-25% by weight.

2. The coating composition of claim 1 also containing pigments and extenders.

3. The coating composition of claim 2 having a pigment-to-binder weight ratio in the range of 10-40 units pigment per 100 units of binder.

4. The coating composition of claim 3 having a pigment-to-binder weight ratio of about 15 to 100.

5. The coating composition of claim 3 having a pigment-to-binder weight ratio of about 20 to 100.

6. The coating composition of claim 3 having a pigment-to-binder weight ratio of about 30 to 100.

* * * * *